March 8, 1932.   E. D. KERR   1,848,219
SEED TESTER
Filed June 26, 1931
Fig. 1.
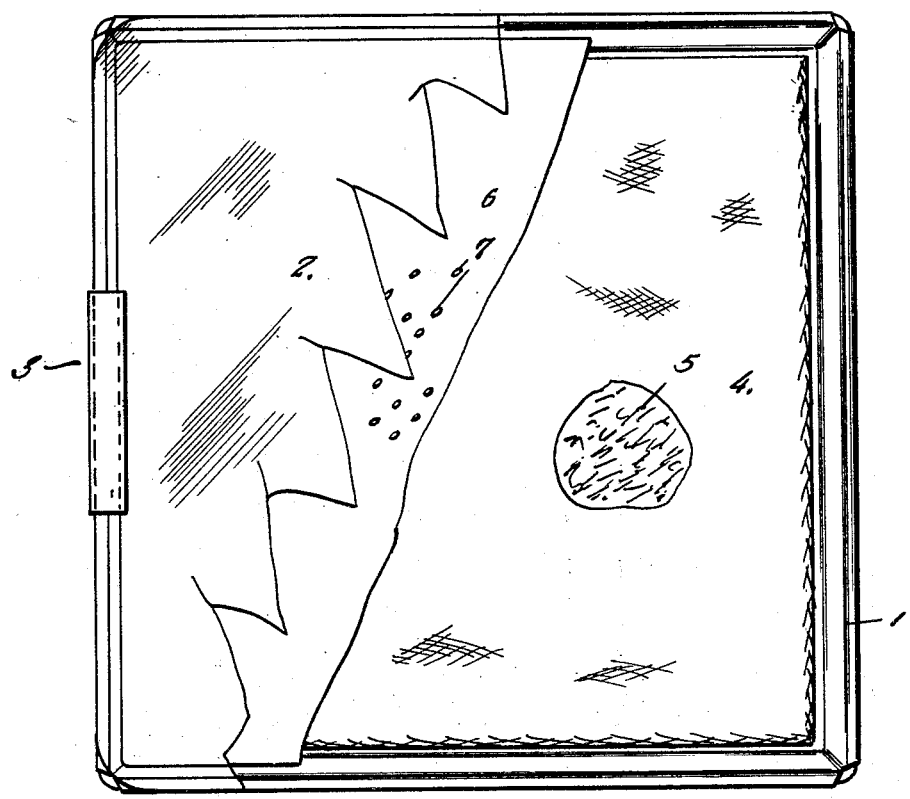
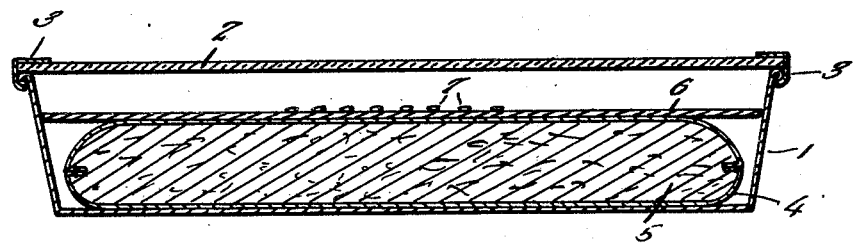
Fig. 2.
Inventor
E. D. Kerr
By Clarence A. O'Brien
Attorney Patented Mar. 8, 1932

1,848,219

UNITED STATES PATENT OFFICE

EDWIN D. KERR, OF BRYAN, OHIO

SEED TESTER

Application filed June 26, 1931. Serial No. 547,145.

This invention relates to a device for testing seeds, the general object of the invention being to provide means whereby seeds of various kinds placed in the device will quickly germinate.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the invention with parts broken away.

Figure 2 is a transverse sectional view thereof.

As shown in these views, the numeral 1 indicates a pan and the numeral 2 indicates a transparent cover for the pan which is held on the pan by the oppositely arranged side clips 3.

A bag 4 preferably contains a specially prepared mixture of ground peat moss as sown at 5, is placed in the bottom part of the pan and is saturated with water. A blotter 6 is then placed on top of the bag and the seeds 7 are placed on this blotter. After the seeds are put in place the transparent cover 2 is placed over the pan and held thereon by the clips 3.

From the foregoing it will be seen that the blotter will absorb some of the water from the saturated bag so that the seeds are affected by the water and they will germinate very quickly.

I have found that the seeds will germinate within a day or two whereas the usual method will require about six days for the seeds to germinate.

The bag with the moss therein will hold the water for a considerable time.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:

1. A seed tester of the class described comprising a pan, a bag having absorbent material therein which is to be saturated with water, an absorbent sheet in the pan resting on the bag for receiving the seed and a transparent cover for the pan.

2. A seed tester of the class described comprising a pan, a bag having ground peat moss therein located in the lower part of the pan, a sheet of blotting paper placed in the pan and resting on the bag for receiving the seed and a transparent cover for the pan and detachably connected therewith.

In testimony whereof I affix my signature.

EDWIN D. KERR.